United States Patent
Singh et al.

(10) Patent No.: US 9,084,102 B1
(45) Date of Patent: Jul. 14, 2015

(54) CONTENTION-FREE HANDOFF OF EMERGENCY TELEPHONE CALLS IN A WIRELESS NETWORK

(71) Applicant: Sprint Communications Company L.P., Overland Park, KS (US)

(72) Inventors: Jasinder Pal Singh, Olathe, KS (US); Siddharth Oroskar, Overland Park, KS (US); Maulik K. Shah, Overland Park, KS (US); Anoop Kumar Goyal, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 134 days.

(21) Appl. No.: 14/010,028

(22) Filed: Aug. 26, 2013

(51) Int. Cl.
*H04M 11/04* (2006.01)
*H04W 36/00* (2009.01)
*H04W 4/22* (2009.01)

(52) U.S. Cl.
CPC ...................... *H04W 4/22* (2013.01)

(58) Field of Classification Search
CPC ............... H04W 74/0833; H04W 74/0866; H04W 72/0406; H04W 72/0413; H04W 74/004; H04W 74/08; H04W 84/12; H04W 74/04; H04W 74/085; H04W 84/045; H04W 24/10; H04W 4/22; H04J 13/0062; H04J 13/0074
See application file for complete search history.

(56) References Cited

U.S. PATENT DOCUMENTS

| 8,165,587 | B2 | 4/2012 | Dahlen et al. | |
|---|---|---|---|---|
| 2009/0073944 | A1* | 3/2009 | Jiang et al. | 370/338 |
| 2009/0175159 | A1* | 7/2009 | Bertrand et al. | 370/203 |
| 2009/0247161 | A1* | 10/2009 | Pani et al. | 455/435.3 |
| 2010/0105405 | A1* | 4/2010 | Vujcic | 455/452.1 |
| 2011/0134862 | A1* | 6/2011 | Huang et al. | 370/329 |
| 2012/0315907 | A1 | 12/2012 | Chin et al. | |
| 2013/0301611 | A1* | 11/2013 | Baghel et al. | 370/331 |
| 2014/0204843 | A1* | 7/2014 | Larsson et al. | 370/329 |
| 2014/0334448 | A1* | 11/2014 | Langereis et al. | 370/331 |

FOREIGN PATENT DOCUMENTS

| EP | 2241055 | 8/2009 |
|---|---|---|
| EP | 2497284 | 5/2011 |
| EP | 2497285 | 5/2011 |
| EP | 2487985 | 8/2012 |
| WO | 2009099356 | 8/2009 |
| WO | 2011057055 | 5/2011 |
| WO | 2011057056 | 5/2011 |

* cited by examiner

*Primary Examiner* — Ajit Patel

(57) ABSTRACT

An enhanced Node B (eNB) and method for contention-free handoff of an emergency telephone call in a wireless network are provided. The eNB in one example embodiment includes a transceiver system configured to communicate with a User Equipment (UE) and a processing system coupled to the transceiver system and configured to receive a telephone call from the UE via the transceiver system, determine if the telephone call comprises an emergency telephone call, if the telephone call comprises an emergency telephone call, then determine neighbor eNBs that are not configured to provide contention-free handoffs, if the telephone call comprises an emergency telephone call, then reserve a contention-free (CF) preamble from each neighbor eNB that is not configured to provide contention-free handoffs, and provide the reserved CF preambles to the UE.

19 Claims, 5 Drawing Sheets

CONTENTION-FREE HANDOFF OF EMERGENCY TELEPHONE CALLS IN A WIRELESS NETWORK

TECHNICAL FIELD

Aspects of the disclosure are related to the field of wireless communications, and in particular, to contention-free handoffs of emergency telephone calls in a wireless network.

TECHNICAL BACKGROUND

Wireless communication systems, such as cellular voice and data networks, typically include multiple wireless access nodes spread over a geographic area. As a result, wireless communication devices can register at various wireless access nodes and access communication services. In many examples, the wireless communication devices are mobile, and can move between wireless coverage areas of the wireless access nodes. As a result, people can use cellular telephones in a wide variety of locations and can make calls while moving or traveling.

Continuous cellular telephone service is available through handoffs, wherein an active cellular telephone can move from cell to cell in a cellular network. The cellular network hands off the cellular telephone from one base station to the next. As a result, a user receives continuous and uninterrupted service.

A handoff may occur where the cellular telephone is moving from one cell to the next and a handoff must be performed for the cellular telephone to maintain communications. Alternately, a handoff may occur where a cellular telephone is in a region overlapped by another cell and the cellular telephone is handed off to provide more capacity in the cell. In another alternative, a handoff may occur where a cellular telephone is experiencing interference in a current cell and is handed off to a neighboring cell to reduce interference.

In a handoff, an adjacent cell will be using a different set of frequencies in order to avoid interference. Consequently, during a handoff process, the cellular telephone must negotiate with both a current cell and a next cell over the transfer of service. Issues that must be addressed are the identity of the cellular telephone and the traffic load/capacity of the next cell, for example.

Emergency telephone calls may be received in a wireless network. Emergency systems have been implemented that handle and facilitate emergency telephone calls, such as Enhanced 911 (E911), Next Generation 911 (NG911), and Wireless Priority Service (WPS), for example. In the event of an emergency telephone call being received in a wireless network, the emergency telephone call should be given a high priority. This includes facilitating handoffs of the emergency telephone call between cells of the wireless network.

OVERVIEW

Systems and methods for contention-free handoff of an emergency telephone call in a wireless network are provided herein. In one example, an enhanced Node B (eNB) for contention-free handoff return in a wireless network includes a transceiver system configured to communicate with a User Equipment (UE) and a processing system coupled to the transceiver system. The processing system is configured to receive a telephone call from the UE via the transceiver system, determine if the telephone call comprises an emergency telephone call, if the telephone call comprises an emergency telephone call, then determine neighbor eNBs that are not configured to provide contention-free handoffs, if the telephone call comprises an emergency telephone call, then reserve a contention-free (CF) preamble from each neighbor eNB that is not configured to provide contention-free handoffs, and provide the reserved CF preambles to the UE.

In an example of a contention-free handoff method of an emergency telephone call in a wireless network having an enhanced Node B (eNB), the method includes in the eNB, receiving a telephone call from a User Equipment (UE), in the eNB, determining if the telephone call comprises an emergency telephone call, in the eNB, if the telephone call comprises an emergency telephone call, then the eNB determining neighbor eNBs that are not configured to provide contention-free handoffs, in the eNB, if the telephone call comprises an emergency telephone call, then the eNB reserving contention-free (CF) preambles from the neighbor eNBs that are not configured to provide contention-free handoffs, and in the eNB, providing the reserved CF preambles to the UE.

In another example of a contention-free handoff method of an emergency telephone call in a wireless network having an enhanced Node B (eNB), the method includes in the eNB, receiving a telephone call from a User Equipment (UE), in the eNB, determining if the telephone call comprises an emergency telephone call, in the eNB, if the telephone call comprises an emergency telephone call, then the eNB determining neighbor eNBs that are not configured to provide contention-free handoffs, in the eNB, if the telephone call comprises an emergency telephone call, then the eNB reserving a contention-free (CF) preamble from each neighbor eNB that is not configured to provide contention-free handoffs, in the eNB, providing the reserved CF preambles to the UE, and in the eNB, re-reserving the reserved CF preambles if a predetermined preamble time period expires without a handoff occurring.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
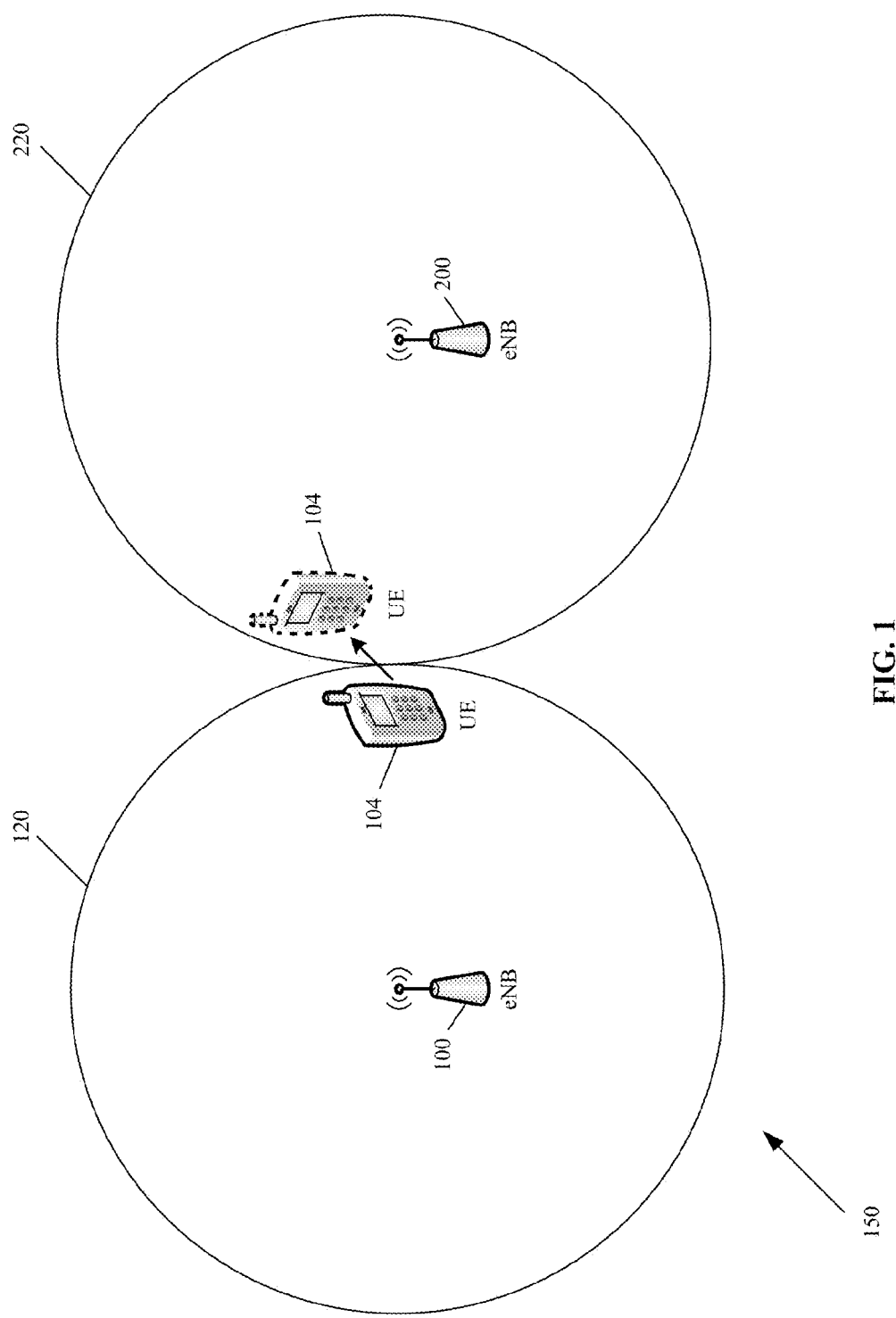
FIG. 1 shows an exemplary wireless network.

FIG. 1 shows an exemplary wireless network 150. The wireless network 150 in some examples comprises a Long-Term Evolution (LTE) wireless network 150. The wireless network 150 includes an enhanced/evolved Node B (eNB) 100, a User Equipment (UE) 104, and one or more neighbor eNBs 200. It should be understood that the wireless network 150 can include other components that are omitted for clarity. The eNBs 100 and 200 comprise evolved base stations that control and wirelessly communicate with mobile devices.

The eNBs 100 and 200, and other devices of the wireless network 150, exchange communications using a LTE wireless communication protocol or a Voice Over LTE (VoLTE) wireless communication protocol, for example.

Emergency telephone calls may be received in the wireless network 150. The wireless network 150 includes an emergency system or systems that handle and facilitate emergency telephone calls, such as Enhanced 911 (E911), Next Generation 911 (NG911), or Wireless Priority Service (WPS), for example. An emergency telephone call typically comprises a voice call, but can include or further comprise non-voice data, such as for hearing-impaired or sight-impaired persons. In the event of an emergency telephone call being received in the wireless network 150, the emergency telephone call should be given high priority, including facilitating handoffs of the emergency telephone call between cells/eNBs of the wireless network 150.

The eNB 100 includes a cell coverage area 120. The neighbor eNB 200 includes a cell coverage area 220. In the figure, the cell coverage area 220 of the neighbor eNB 200 is located substantially adjacent to the cell coverage area 120 of the eNB 100. The cell coverage area 220 of the neighbor eNB 200 may approach or even overlap the cell coverage area 120 of the eNB 100.

The UE 104 is shown within the cell coverage area 120. The UE 104 can register with the eNB 100 and conduct wireless communications, such as wireless telephone calls, for example. The UE 104 comprises a wireless communication device that moves within the eNB cell coverage areas. Further, the UE 104 can move between eNB cell coverage areas.

In the figure, the UE 104 is operating at a cell edge region of the cell coverage area 120. When the UE 104 is moving out of the cell coverage area 120, as indicated by the arrow in the figure, it may become necessary for the UE 104 to be handed off from the eNB 100 to the neighbor eNB 200. A handoff may occur due to the motion of the UE, a change in eNB signal strength, an eNB capacity or traffic level, or interference, for example.

The UE 104 can monitor wireless conditions in relation to the eNB 100, including a received signal strength and a Channel Quality Indicator (CQI), for example. The UE 104 can transmit such values to the eNB 100. When operating within the cell edge region, the UE 104 will experience low signal strengths. The UE 104 will experience low signals strengths in both the forward link from the eNB 100 to the UE 104 and in the reverse link from the UE 104 to the eNB 100. In addition, the UE 104 can monitor the signals received from other devices, including from the neighbor eNB 200 (and other adjacent neighbor eNBs).

Generally, the first access to the system by the UE 104 is performed by means of a random access (RA) procedure. The objectives of the RA procedure may include achieving initial access to a cell, handover between cells, scheduling request (request for radio resources), timing synchronization, and the like.

During the handoff process, the UE 104 obtains a preamble that is used to initiate communications with the neighbor eNB 200. The preamble comprises a symbol or code that the UE 104 employs to signal the neighbor eNB 200 and initiate communications with the neighbor eNB 200.

The preamble can comprise a contention-based (CB) preamble or can comprise a contention-free (CF) preamble. A CB preamble comprises a publicly known and available preamble. For example, the neighbor eNB 200 can broadcast or publish a listing of CB preambles that can be used to access the neighbor eNB 200. The UE 104 can arbitrarily select a CB preamble from a pool of CB preambles for the neighbor eNB 200. This is also known as UE-initiated random access. However, in a contention-based handoff, the neighbor eNB 200 does not regulate which devices can acquire and use a particular CB preamble. As a result, multiple devices can attempt to access the neighbor eNB 200 at the same time and using the same CB preamble. The consequence is a signal collision, where one or more devices involved in the collision will not gain access to the neighbor eNB 200 and must make additional access attempts.

In contrast to the CB preamble, a contention-free (CF) random access preamble will be assigned to the UE 104 by the neighbor eNB 200. No other requesting device will be given the same CF preamble during an applicable time period. In other words, the CF preamble is not autonomously selected by the UE, and instead is dispensed by the neighbor eNB 200. Therefore, during the time period that the assigned CF preamble is valid, it is exclusively dedicated to the UE 104. This is also known as network-triggered or network-ordered random access. As a result, the UE 104 can access the neighbor eNB 200 without danger of signal collision and delay. This eliminates the need for contention resolution procedures and improves resource efficiency. Avoiding the contention resolution procedure reduces delay. Consequently, a CF preamble is more desirable than a CB preamble, and especially when a telephone call placed by the UE 104 is an emergency telephone call.

In a multi-cell environment, the UE 104 may receive a signal from one or more neighboring cells. In operation, the UE 104 performs various scheduled measurements such as received signal amplitude and signal transport delay. Based on the measurements and event triggers given to the UE 104 by the eNB 100, the UE 104 may transmit a measurement report to the eNB 100. Based on the measurement report and neighboring base stations/cells included in the report, the eNB 100 selects an appropriate neighbor eNB 200 to receive a handoff of the UE 104.

The wireless network 150 decides when the UE 104 must be handed off from the eNB 100 to the neighbor eNB 200. The eNB 100 can initiate the handoff, such as where the eNB 100 determines that the UE 104 is approaching the cell edge region of the cell coverage area 120. The eNB 100 can determine that the UE 104 is approaching the cell edge region by generating a signal strength measurement or measurements of the signal or signals received from the UE 104. Alternatively, or in addition, the eNB 100 can receive a signal strength measurement or measurements from the UE 104, wherein the signal strength measurements are the measured signal strengths of a signal or signals received in the UE 104 from the eNB 100 and from one or more of the neighbor eNBs 200. If the signal strength is below a predetermined strength threshold, then the eNB 100 can determine that the UE 104 is approaching the cell edge region and should be handed off to one of the neighbor eNBs 200. Further, from the signal strength measurements, the eNB 100 (or other component of the wireless network 150) can determine a particular neighbor eNB 200 for the handoff.

Figure 2:
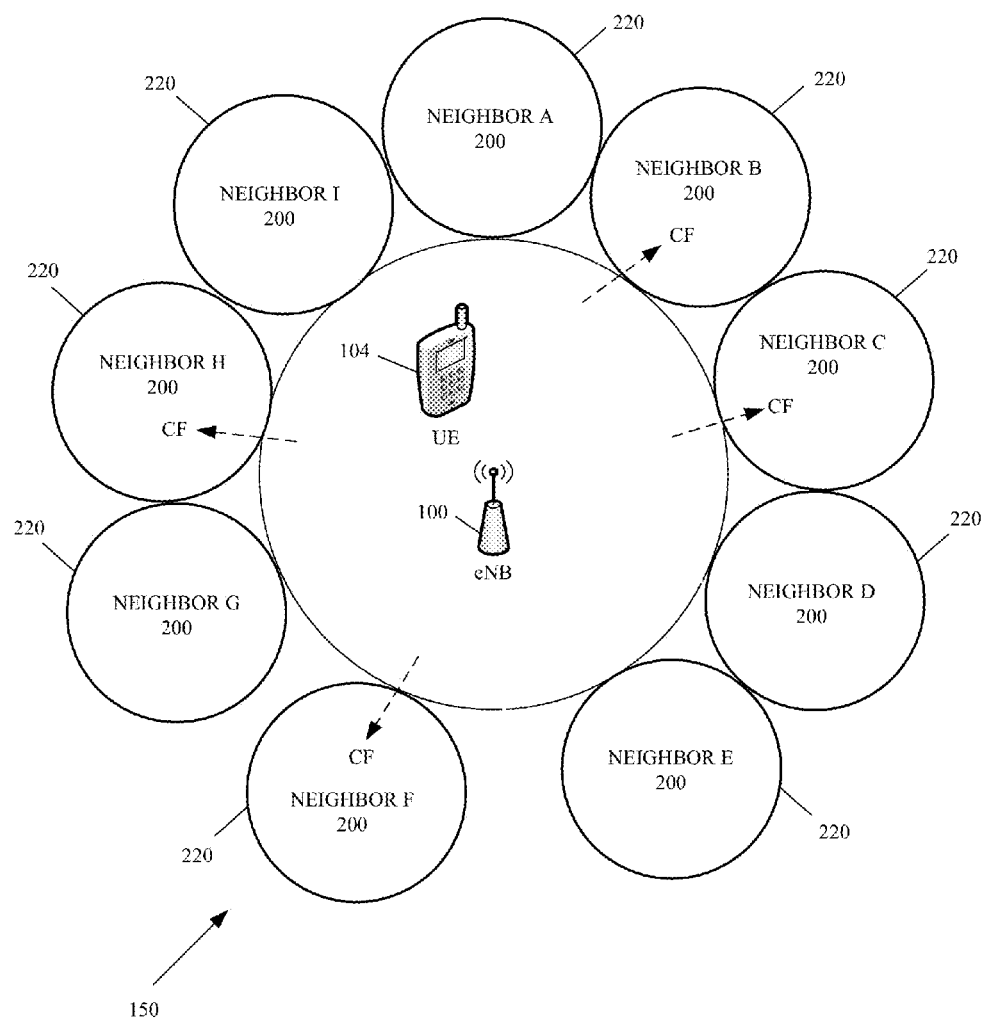
FIG. 2 shows an enhanced/evolved Node B (eNB) surrounded by multiple neighbor eNBs.

FIG. 2 shows the eNB 100 surrounded by multiple neighbor eNBs 200. The neighbor eNBs 200 in the example shown comprise nine neighbor eNBs A-I 200. However, it should be understood that the eNB 100 can include any number of neighbor eNBs 200. In addition, the neighbor cell coverage areas 220 are not shown to scale and may be smaller than, equal to, or larger than the cell coverage area 120 of the eNB 100. It can be seen that if the UE 104 moves out of the cell coverage area 120 of the eNB 100, then the UE 104 will need to be handed off to one of the neighbor eNBs A-I 200.

The handoff of the UE 104 to one of the neighbor eNBs 200 will be easily and efficiently accomplished if all of the neighbor eNBs A-I 200 are capable of performing contention-free handoffs (see dashed arrows and "CF" labels). However, if a target neighbor eNB 200 is not capable of a contention-free handoff, then handoff of the emergency telephone call could be problematic. For example, the emergency telephone call handoff could result in a collision with another call, wherein the emergency telephone call handoff could be subjected to delays and retries. This is not acceptable in most normal telephone calls, and is far more problematic of the telephone call being handed off is an emergency telephone call.

It is currently common practice of an emergency operator or dispatcher to assign all neighboring eNBs 200 a contention-free capability for the eventuality that one (or more) of the neighboring eNBs 200 may be the target of a future handoff. However, the emergency operator may not do this for all neighbor eNBs 200, with the result being a potential for handoff delay or other negative effects.

Figure 3:
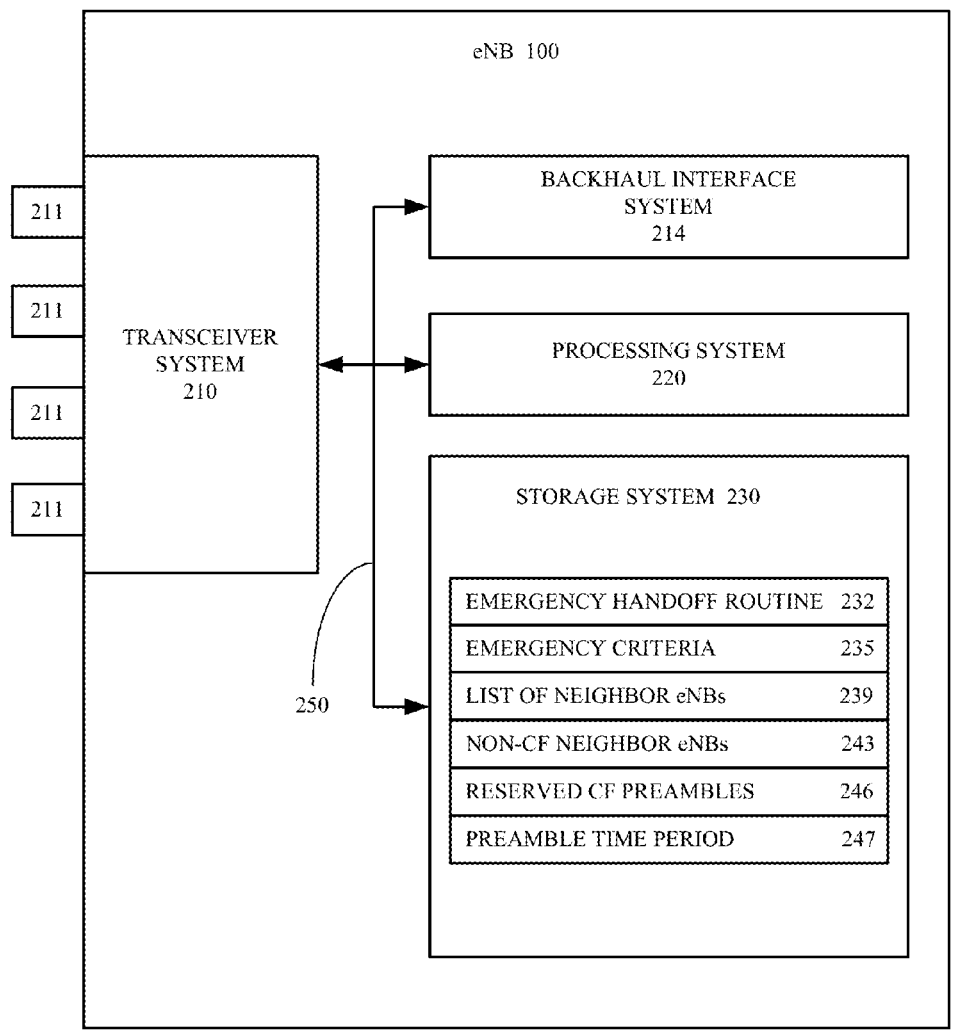
FIG. 3 shows an exemplary eNB.

FIG. 3 shows an exemplary eNB 100. The eNB 100 includes a transceiver system 210, a backhaul interface system 214, a processing system 220, and a storage system 230. In operation, the processing system 220 is operatively linked to the transceiver system 210, the backhaul interface system 214, and the storage system 230, such as by a bus 250, for example. It should be understood that alternatively discrete links can be employed, such as network links or other circuitry. The eNB 100 can be distributed or consolidated among equipment or circuitry that together form the elements of the eNB 100. The eNB 100 can optionally include additional devices, features, or functionality not shown for clarity.

The storage system 230 comprises computer-readable storage media that is readable by the processing system 220 and capable of storing information. In one example, the storage system 230 stores an emergency call handoff routine 233, emergency call criteria 235, a list of neighbor eNBs 239, a list of non-CF neighbor eNBs 243, reserved CF preambles 246, and a return time period 247.

The emergency call handoff routine 233 facilitates an emergency telephone call handoff. The emergency call handoff routine 233 can be used by the eNB 100 to prepare for an emergency telephone call handoff of the UE 104 from the eNB 100 to a neighbor eNB 200 of multiple neighbor eNBs 200.

The emergency call criteria 235 comprises criteria for determining whether a received telephone call comprises an emergency telephone call. The emergency call criteria 235 can be compared to a received telephone call by the eNB 100 in order to determine whether the received telephone call comprises an emergency telephone call. If characteristics of the received telephone call match the emergency call criteria 235, then the eNB 100 can determine that the received telephone call comprises an emergency telephone call.

In one example, the emergency call criteria 235 comprises the "911" emergency number or emergency number prefix that is used within the United States for designating an emergency telephone call. The emergency number or emergency number prefix may vary by location, and may differ for other countries.

The list of neighbor eNBs 239 comprises a list of identified neighbor eNBs 200. The list of neighbor eNBs 239 comprise at least a portion of the neighbor eNBs 200 that the UE 104 could be handed off to by the eNB 100. The list of neighbor eNBs 239 can comprise some or all neighbor eNBs 200, where the neighbor cell coverage areas 220 of the neighbor eNBs 200 are adjacent to, are touching, or are overlapping the cell coverage area 120 of the eNB 100.

The list of non-CF neighbor eNBs 243 comprises a list of neighbor eNBs 200 that are not configured to provide contention-free handoffs. The list of non-CF neighbor eNBs 243 may include neighbor eNBs 200 that have not been configured to provide contention-free handoffs for the emergency telephone call. The list of non-CF neighbor eNBs 243 can include neighbor eNBs 200 that have been overlooked by an emergency operator, for example.

The reserved CF preambles 246 comprise CF preambles that are obtained from at least some of the neighbor eNBs 200. The reserved CF preambles 246 comprise CF preambles that are obtained from neighbor eNBs 200 included in the list of non-CF neighbor eNBs 243. The reserved CF preambles 246 are reserved by the eNB 100 in preparation for handing off the UE 104 to any one of the neighbor eNBs 200. The reserved CF preambles 246 can be used by the UE 104 to initiate communications with a particular neighbor eNB 200 if and when a handoff actually occurs.

The return time period 247 comprises a predetermined time period in which the reserved CF preambles 246 can be used by the UE 104 in a handoff to a neighbor eNB 200. If the return time period 247 expires before a handoff occurs, then the eNB 100 will have to re-reserve the reserved CB preambles 246.

The emergency call handoff routine 233 can be implemented in program instructions and among other functions which can, when executed by the eNB 100 in general or the processing system 220 in particular, operates to direct the eNB 100 or the processing system 220 to receive a telephone call from a UE, determine if the telephone call comprises an emergency telephone call, if the telephone call comprises an emergency telephone call, then determine neighbor eNBs that are not configured to provide contention-free handoffs, if the telephone call comprises an emergency telephone call, then reserve CF preambles from the neighbor eNBs that are not configured to provide contention-free handoffs, and provide the reserved CF preambles to the UE.

In some embodiments, the emergency call handoff routine 233, when executed by the eNB 100 in general or the processing system 220 in particular, operates to direct the eNB 100 or the processing system 220 to receive a telephone call from a UE, determine if the telephone call comprises an emergency telephone call, if the telephone call comprises an emergency telephone call, then determine neighbor eNBs that are not configured to provide contention-free handoffs, if the telephone call comprises an emergency telephone call, then reserve a CF preamble from each neighbor eNB that is not configured to provide contention-free handoffs, provide the reserved CF preambles to the UE, and re-reserve the reserved CF preambles if a predetermined preamble time period expires without a handoff occurring.

Figure 4:
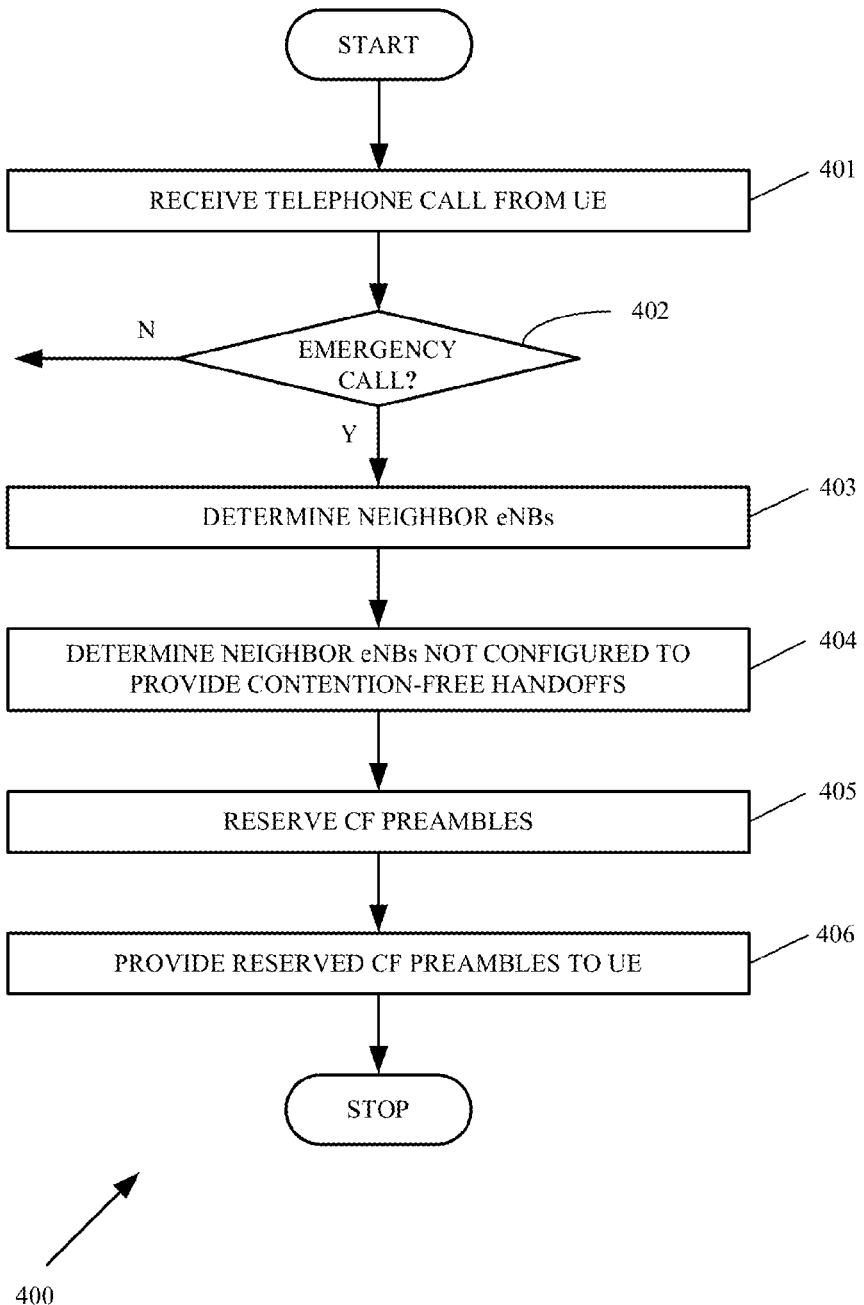
FIG. 4 is a flowchart of an exemplary contention-free handoff of an emergency telephone call in a wireless network.

FIG. 4 is a flowchart 400 of an exemplary contention-free handoff method of an emergency telephone call in a wireless network. In step 401, the eNB receives a telephone call from the UE.

In step 402, the eNB determines if the received telephone call is an emergency telephone call. The eNB can determine that the received telephone call is an emergency telephone call in any suitable manner, such as by a designated emergency number or emergency number prefix. If the received telephone call is an emergency telephone call, then the method proceeds to step 403. Otherwise, the method exits.

In step 403, the eNB determines the neighbor eNBs. The neighbor eNBs comprise at least a portion of the neighbor eNBs that the UE could be handed off to by the eNB. The neighbor eNBs can comprise some or all neighbor eNBs, where the neighbor cell coverage areas of the neighbor eNBs are adjacent to, are touching, or are overlapping the cell coverage area of the eNB.

In step 404, the eNB determines the neighbor eNBs that are not configured to provide contention-free handoffs. For example, one or more of the neighbor eNBs may only provide contention-based handoffs and CB preambles. As previously discussed, a CB preamble comprises a publicly known and available preamble. An eNB can broadcast or publish a listing of CB preambles that can be used to publicly access that eNB. However, in a contention-based random access procedure, an eNB does not regulate or control which CB preamble is selected by the UE. As a result, in a contention-based random access procedure, multiple devices can attempt to access the eNB at the same time and using the same CB preamble. The consequence may be a signal collision, where one or more devices involved in the collision will not gain access to the eNB and must make additional access attempts.

A contention-based handoff is more likely to result in delays and re-tries in a handoff. Therefore, a contention-based handoff is not desirable in emergency telephone call handoffs.

In step 405, the eNB communicates with the neighbor eNBs that are not configured to provide contention-free handoffs and reserves CF preambles. The reserved CF preambles can be used to obtain contention-free access to the neighbor eNBs that are not configured to provide contention-free handoffs. The UE is not able to autonomously obtain the CF preambles, as previously discussed.

In step 406, the eNB provides the reserved CF preambles to the UE. As a result, the UE can now be handed off in a contention-free manner to any of the neighboring eNBs. The UE can be handed off to any of the neighbor eNBs that are not configured to provide contention-free handoffs. Consequently, the UE is readied in advance for all possible contention-free handoffs.

A reserved CF preamble will enable the UE to use a contention-free random access signaling process to establish communications with a neighbor eNB in the event of a handoff. This can include the UE transmitting an access burst to a particular neighbor eNB over a random access channel (RACH). The RACH is a channel configured for receiving access bursts from UEs as a step in initiating communications. Access bursts are transmitted by the UE to allow the particular neighbor eNB to measure uplink communication parameters such as transmission delay, signal amplitude, and other needed communication parameters. Consequently, a handoff to a neighbor eNB is unlikely to suffer delay and/or retry attempts. As a result, the UE making the emergency telephone call can move uneventfully to a neighbor eNB in the event of a handoff. Consequently, even if a human emergency operator neglects to set up neighboring cells for contention-free handoffs, the eNB can ensure that all neighbor eNBs can perform contention-free handoffs for the emergency telephone call.

Figure 5:
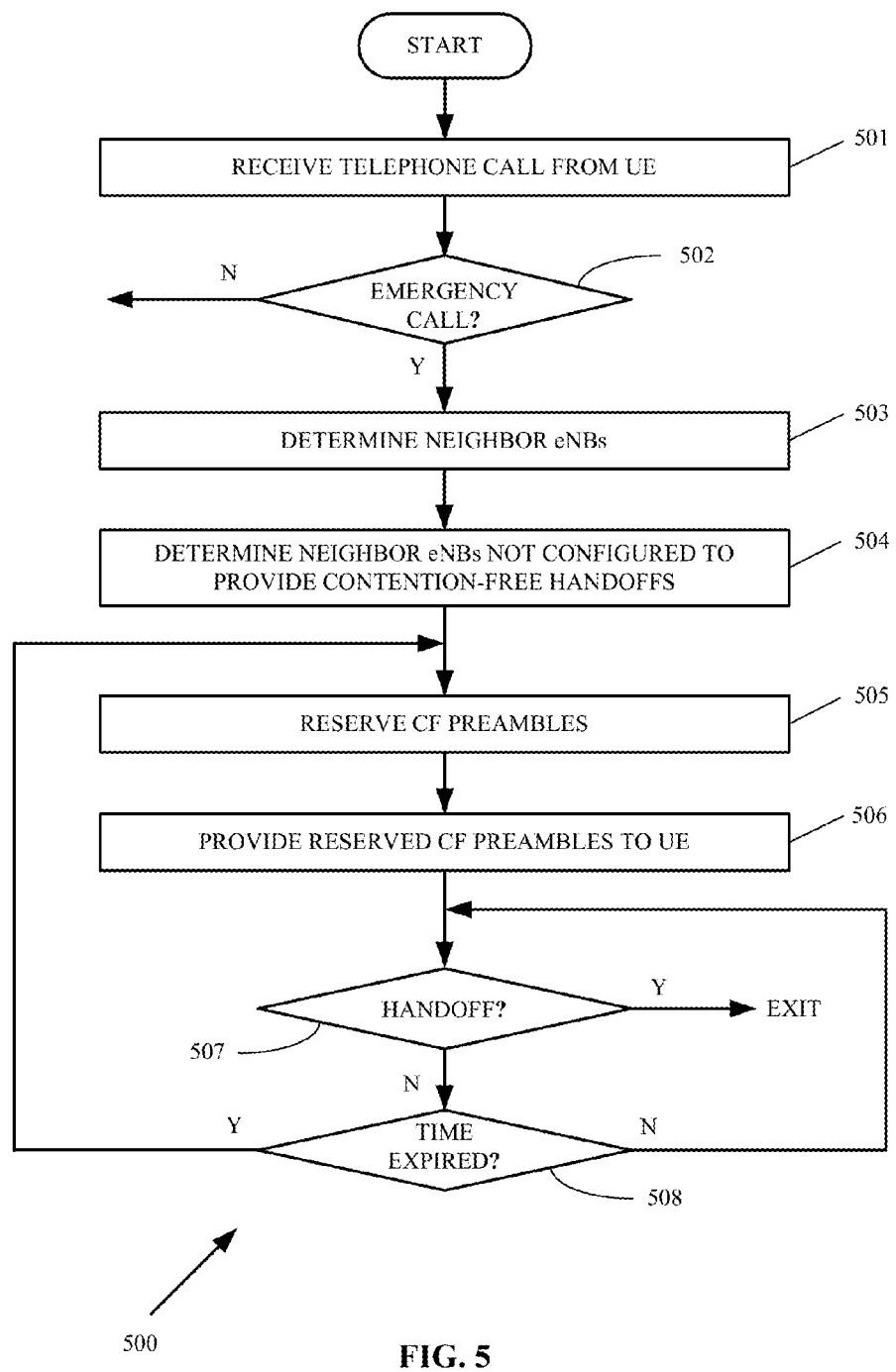
FIG. 5 is a flowchart of another exemplary contention-free handoff of an emergency telephone call in a wireless network.

FIG. 5 is a flowchart 500 of another exemplary contention-free handoff method of an emergency telephone call in a wireless network. In step 501, the eNB receives a telephone call from the UE, as previously discussed.

In step 502, the eNB determines if the received telephone call is an emergency telephone call, as previously discussed. If the received telephone call is an emergency telephone call, then the method proceeds to step 503. Otherwise, the method exits.

In step 503, the eNB determines the neighbor eNBs, as previously discussed.

In step 504, the eNB determines the neighbor eNBs that are not configured to provide contention-free handoffs, as previously discussed.

In step 505, the eNB communicates with the neighbor eNBs that are not configured to provide contention-free handoffs and reserves CF preambles, as previously discussed.

In step 506, the eNB provides the reserved CF preambles to the UE, as previously discussed. As a result, the UE can now be handed off in a contention-free manner to any of the neighboring eNBs. The UE can be handed off to any of the neighbor eNBs that are not configured to provide contention-free handoffs. Consequently, the UE is readied in advance for all possible contention-free handoffs.

In step 507, the method determines if a handoff to a neighbor eNB has occurred. If a handoff has not occurred, then the method proceeds to step 508. Otherwise, where a handoff has occurred, the method exits.

In step 508, the UE determines whether a predetermined preamble time period has expired. The preamble time period comprises a predetermined time period during which the reserved CF preambles can be used by the UE in a handoff. If the preamble time period has expired, then the eNB will have to re-reserve the reserved CB preambles. If the preamble time period has not expired, then the method branches back to step 507. Otherwise, where the preamble time period has expired, the method branches back to step 505 and the reserved CF preambles are iteratively re-reserved.

The reserved CF preambles may be iteratively re-reserved until a predetermined event occurs. The reserved CF preambles may be iteratively re-reserved until a predetermined preamble time period expiration occurs. The reserved CF preambles may be iteratively re-reserved until a handoff occurs. The reserved CF preambles may be iteratively re-reserved until an emergency telephone call termination occurs. The reserved CF preambles may be iteratively re-reserved until one of a predetermined preamble time period expiration, a handoff, or an emergency telephone call termination occurs.

The eNBs 100 and 200 can comprise any manner of wireless base station. The eNBs 100 and 200 can provide communication services including voice calls, text messages, data access, or other communication services provided over cellular or wireless communication networks. In some examples, the eNBs 100 and 200 include equipment to provide wireless access within different coverage areas, to route communications between content providers and user devices, and to facilitate handoffs between UEs within different coverage areas, among other operations.

The eNBs 100 and 200 may communicate with the UE 104 using a variety of frequencies and a variety of communication schemes. The eNBs 100 and 200 can provide multiple sectors of wireless coverage. It should be understood that any number of eNBs can be included in a wireless communication system.

The eNBs 100 and 200 comprise RF communication and control circuitry, transceivers, and antennas, as well as wireless communications equipment capable of communicating with and providing wireless access within a wireless coverage area to communication services for wireless communication devices, such as the UE 104. The RF communication circuitry typically includes amplifiers, filters, RF modulators, transceivers, and signal processing circuitry. The eNBs 100 and 200 may include processing equipment, routing equipment, and physical structures. The eNBs 100 and 200 may include transceiver and antenna equipment for exchanging wireless communications with one or more UEs 104 in a sector of wireless coverage. Further equipment, networks, and/or systems can be communicatively coupled to the eNBs 100 and 200, such as equipment, networks, and systems of cellular voice and data communication systems (not shown for clarity). It should be understood that the eNBs 100 and 200 can be distributed or consolidated among equipment or circuitry that together forms the elements of the eNBs 100 and 200. The eNBs 100 and 200 can optionally include additional devices, features, or functionality not discussed herein for the purpose of brevity.

The UE 104 may be a mobile device, including a cellular phone, but also may include other devices. The UE 104 may include one or more transceiver portions for communication over one or more wireless links of differing frequency bands. The UE 104 can receive wireless access information from one or more of the eNBs 100 and 200, such as beacon signals, channel information, frequency information, overhead signaling, neighbor lists, and the like. The UE 104 can move among any of the coverage areas associated with the eNBs 100 and 200 and receive wireless access.

The UE 104 can include one or more antennas, transceiver circuitry elements, and communication elements. The transceiver circuitry typically includes amplifiers, filters, modulators, and signal processing circuitry. The UE 104 can also include user interface systems, memory devices, non-transitory computer-readable storage mediums, software, processing circuitry, or some other communication components. The UE 104 can comprise subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof.

The transceiver system 210 comprises one or more communication interfaces for communicating with one or more UEs, namely multiple transceiver nodes 211. The transceiver system 210 operates the transceiver nodes 211 to conduct wireless communications with the UE 104, coordinate the handoff of the UE 104 with other eNBs or other devices or systems, exchange authentication or authorization information with other communication networks, and provide data and/or parameters to one or more UEs 104.

The backhaul interface system 214 includes a network interface for communicating with one or more communication networks, such as wire and/or wireless communication systems. Examples of the backhaul interface system 214 include network interface card equipment, transceivers, modems, and other communication circuitry. In addition, the backhaul interface system 214 can communicate with external devices. The backhaul interface system 214 provides command and control information and instructions to the processing system 220 or to the transceiver system 210. The backhaul interface system 214 can change data in the storage system 230 and can affect the operation of the processing system 220 and the operation of the eNB 100.

The transceiver nodes 211 of the transceiver system 210 of the eNB 100 each include transceiver equipment for wirelessly exchanging user communications and overhead communications with user devices, omitted for clarity, using antenna arrays and the associated wireless links. The transceiver nodes 211 can comprise one or more antenna elements, RF coupling equipment, structural supports, cabling, or other equipment. In some examples, elements of the transceiver nodes 211 can comprise a directed antenna array, such as a yagi antenna, dish antenna, parabolic antenna, or phased antenna array to establish beam forming during transmissions to user devices.

The processing system 220 of the eNB 100 can comprise one or more microprocessors and other circuitry that retrieves and executes the emergency call handoff routine 233 from the storage system 230. The processing system 220 can be implemented within a single processing device but can also be distributed across multiple processing devices or sub-systems that cooperate in executing program instructions. Examples of the processing system 220 include general purpose central processing units, application specific processors, and logic devices, as well as any other type of processing device, combinations, or variations thereof.

The storage system 230 of the eNB 100 can comprise any computer readable storage media readable by the processing system 220 and capable of storing the emergency call handoff routine 233. The storage system 230 can include volatile and nonvolatile, removable and non-removable media implemented in any method or technology for storage of information, such as computer readable instructions, data structures, program modules, or other data.

In addition to storage media, in some implementations the storage system 230 can also include communication media over which the emergency call handoff routine 233 can be communicated. The storage system 230 can be implemented as a single storage device but can also be implemented across multiple storage devices or sub-systems co-located or distributed relative to each other. The storage system 230 can comprise additional elements, such as a controller, capable of communicating with the processing system 220. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

The emergency call handoff routine 233 of the eNB 100 can include additional processes, programs, or components, such as operating system software, database software, or application software. The emergency call handoff routine 233 can also comprise firmware or some other form of machine-readable processing instructions executable by the processing system 220. In at least one implementation, the program instructions can include first program instructions that direct the processing system 220 to exchange communications with the UE 104 over one or more transceiver nodes 211, among other operations.

In general, the emergency call handoff routine 233 can, when loaded into the processing system 220 and executed, transform the processing system 220 into a special-purpose computing system configured to exchange communications with the UE 104 over one or more transceiver nodes, among other operations. Encoding the emergency call handoff routine 233 on the storage system 230 can transform the physical structure of the storage system 230. The specific transformation of the physical structure can depend on various factors in different implementations of this description. Examples of such factors can include, but are not limited to the technology used to implement the storage media of the storage system 230 and whether the computer-storage media are characterized as primary or secondary storage. For example, if the computer-storage media are implemented as semiconductor-based memory, the emergency call handoff routine 233 can transform the physical state of the semiconductor memory when the program is encoded therein. For example, the emergency call handoff routine 233 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. An enhanced Node B (eNB) for contention-free handoff of an emergency telephone call in a wireless network, the eNB comprising:
a transceiver system configured to communicate with a User Equipment (UE); and
a processing system coupled to the transceiver system and configured to receive a telephone call from the UE via the transceiver system, with the processing system being further configured to determine if the telephone call comprises an emergency telephone call, if the telephone call comprises an emergency telephone call, then determine neighbor eNBs that are not configured to provide contention-free handoffs, if the telephone call comprises an emergency telephone call, then reserve a contention-free (CF) preamble from each neighbor eNB that is not configured to provide contention-free handoffs, and provide the reserved CF preambles to the UE.

2. The eNB of claim 1, with the eNB configured to reserve the reserved CF preambles from at least some of the neighbor eNBs.

3. The eNB of claim 1, with the eNB configured to iteratively re-reserve the reserved CF preambles until a predetermined preamble time period expiration occurs.

4. The eNB of claim 1, with the eNB configured to re-reserve the reserved CF preambles until a handoff occurs.

5. The eNB of claim 1, with the eNB configured to re-reserve the reserved CF preambles until an emergency telephone call termination occurs.

6. The eNB of claim 1, with the eNB configured to re-reserve the reserved CF preambles until one of a predetermined preamble time period expiration, a handoff, or an emergency telephone call termination occurs.

7. The eNB of claim 1, with the eNB further comprising a storage system coupled to the processing system and storing a list of neighbor eNBs and storing a list of non-CF neighbor eNBs that are not configured to provide contention-free handoffs, with reserving the CF preambles comprising reserving the CF preambles from the non-CF neighbor eNBs.

8. A contention-free handoff method of an emergency telephone call in a wireless network having an enhanced Node B (eNB), the method comprising:
in the eNB, receiving a telephone call from a User Equipment (UE);
in the eNB, determining if the telephone call comprises an emergency telephone call;
in the eNB, if the telephone call comprises an emergency telephone call, then the eNB determining neighbor eNBs that are not configured to provide contention-free handoffs;
in the eNB, if the telephone call comprises an emergency telephone call, then the eNB reserving contention-free (CF) preambles from the neighbor eNBs that are not configured to provide contention-free handoffs; and
in the eNB, providing the reserved CF preambles to the UE.

9. The method of claim 8, with the eNB reserving CF preambles comprising the eNB reserving CF preambles from at least some of the neighbor eNBs.

10. The method of claim 8, with the eNB reserving CF preambles further comprising the eNB iteratively re-reserving the reserved CF preambles until a predetermined preamble time period expiration occurs.

11. The method of claim 8, with the eNB reserving CF preambles further comprising the eNB iteratively re-reserving the reserved CF preambles until a handoff occurs.

12. The method of claim 8, with the eNB reserving CF preambles further comprising the eNB iteratively re-reserving the reserved CF preambles until an emergency telephone call termination occurs.

13. The method of claim 8, with the eNB reserving CF preambles further comprising the eNB iteratively re-reserving the reserved CF preambles until one of a predetermined preamble time period expiration, a handoff, or an emergency telephone call termination occurs.

14. The method of claim 8, further comprising:
in the eNB, determining the neighbor eNBs of the eNB; and
in the eNB, determining non-CF neighbor eNBs of the neighbor eNBs, with the non-CF neighbor eNBs comprising the neighbor eNBs that are not configured to provide contention-free handoffs, with reserving the CF preambles comprising reserving the CF preambles from the non-CF neighbor eNBs.

15. A contention-free handoff method of an emergency telephone call in a wireless network having an enhanced Node B (eNB), the eNB comprising:
in the eNB, receiving a telephone call from a User Equipment (UE);
in the eNB, determining if the telephone call comprises an emergency telephone call;
in the eNB, if the telephone call comprises an emergency telephone call, then the eNB determining neighbor eNBs that are not configured to provide contention-free handoffs;
in the eNB, if the telephone call comprises an emergency telephone call, then the eNB reserving a contention-free (CF) preamble from each neighbor eNB that is not configured to provide contention-free handoffs;
in the eNB, providing the reserved CF preambles to the UE; and
in the eNB, re-reserving the reserved CF preambles if a predetermined preamble time period expires without a handoff occurring.

16. The method of claim 15, with the eNB reserving CF preambles comprising the eNB reserving CF preambles from at least some of the neighbor eNBs.

17. The method of claim 15, with the eNB reserving CF preambles further comprising the eNB iteratively re-reserving the reserved CF preambles until an emergency telephone call termination occurs.

18. The method of claim 15, with the eNB reserving CF preambles further comprising the eNB iteratively re-reserving the reserved CF preambles until one of a predetermined preamble time period expiration, a handoff, or an emergency telephone call termination occurs.

19. The method of claim 15, further comprising:
in the eNB, determining the neighbor eNBs of the eNB; and
in the eNB, determining non-CF neighbor eNBs of the neighbor eNBs, with the non-CF neighbor eNBs comprising the neighbor eNBs that are not configured to provide contention-free handoffs, with reserving the CF preambles comprising reserving the CF preambles from the non-CF neighbor eNBs.

* * * * *